Patented Mar. 25, 1952

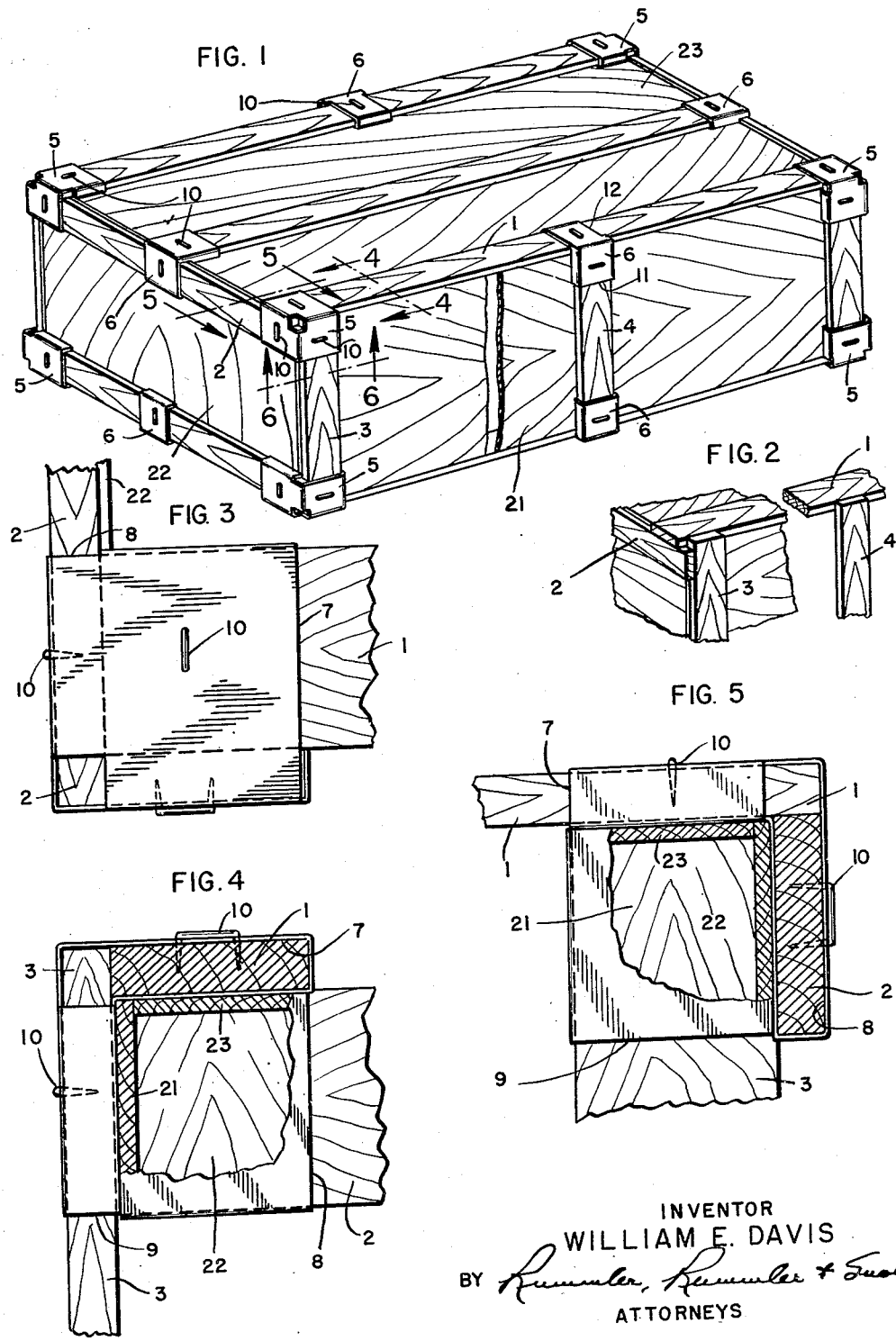

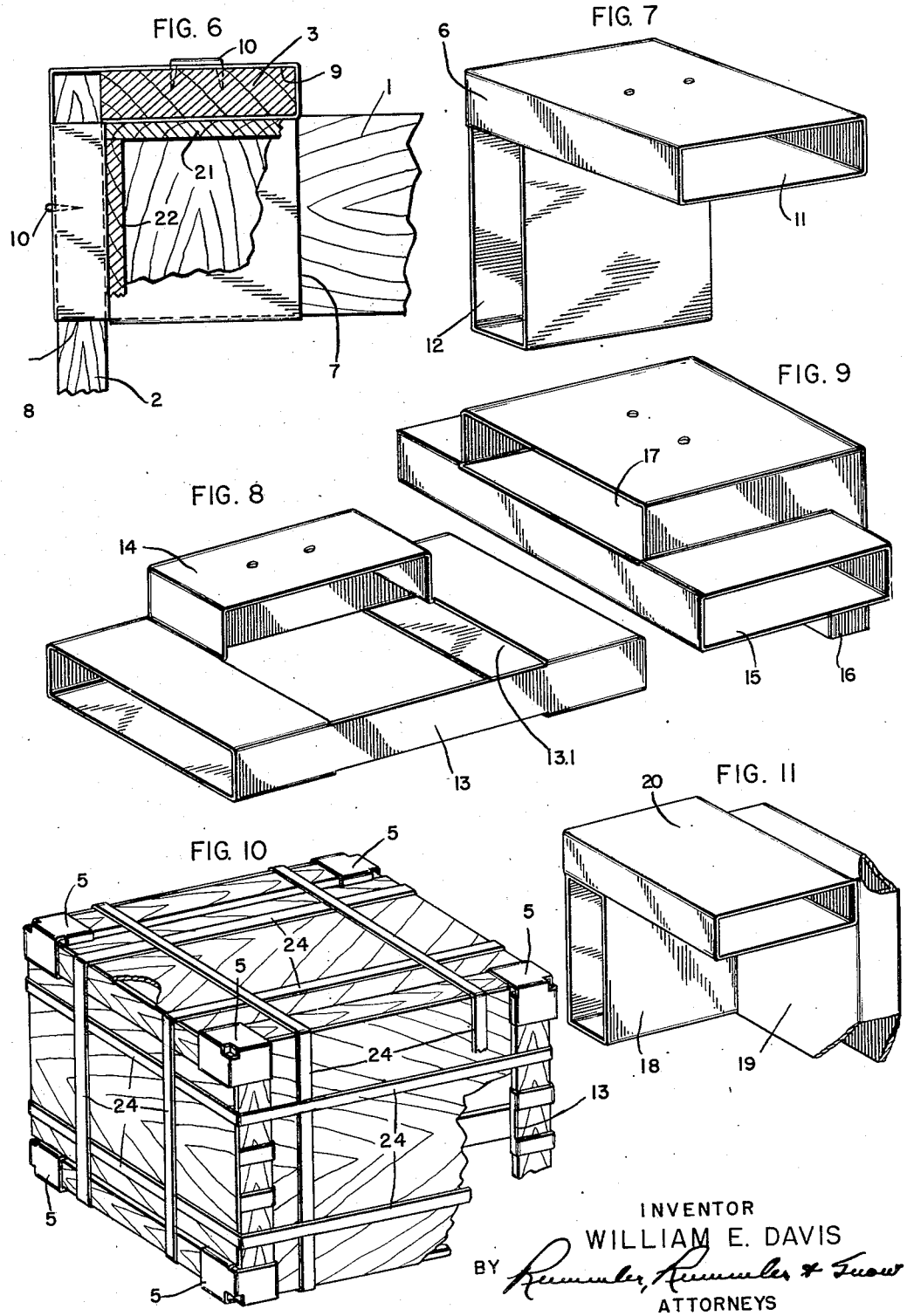

2,590,159

UNITED STATES PATENT OFFICE 2,590,159

CORNER FITTING FOR KNOCKDOWN STRUCTURES

William E. Davis, Chicago, Ill.

Application April 5, 1947, Serial No. 739,679

8 Claims. (Cl. 217—65)

This invention relates to packing crates and particularly to fittings or devices for securing the corners and other joints of the crate members upon assembly whereby the crate may be readily knocked down, or disassembled, without damage to the crating members.

The main objects of this invention are to provide an improved device for securing the corners and other joints of a wooden crate; to provide such a device for the joints of crate members that is adaptable to standard crating practice and yet permits one hundred percent salvage of the crating material; to provide an improved slip-joint fitting or joining device for crate members which utilizes standard arrangements of the crating members and particularly the edge-to-face relation thereof; to provide an improved metal corner device for joining crate frame members; to provide such a device that is suitable for both open and closed crates; and to provide such a device that reduces crating material costs and the labor involved in both crating and uncrating operations.

A specific embodiment of this invention is shown in the accompanying drawings in which:

Figure 1 is a perspective view of a closed crate embodying the improved fittings for joining the crate frame members.

Fig. 2 is a fragmentary perspective view of the crate of Fig. 1, with the fittings removed to show the arrangement of the crate frame members in edge-to-face relation according to present standard crating practice.

Fig. 3 is an enlarged fragmentary top plan view of a corner of the crate shown in Fig. 1.

Fig. 4 is a view of the same as taken on line 4—4 of Fig. 1.

Fig. 5 is a view of the same as taken on line 5—5 of Fig. 1.

Fig. 6 is a view of the same as taken on line 6—6 of Fig. 1.

Fig. 7 is a perspective view of a middle brace corner member as employed in the crate of Fig. 1.

Fig. 8 is a perspective view of a modified form of middle brace fitting or joining member.

Fig. 9 is a perspective view of another modification of the middle brace fitting or joining member.

Fig. 10 is a perspective view of a closed crate, utilizing binding straps to secure the assembled crate members, and Fig. 11 is a perspective view of a crate corner member fabricated from separate tubular sections welded together into a unitary structure.

As shown in the drawings, the improved crate construction comprises the usual boards or crate members arranged in the form of a rectangular frame and characterized by the provision of fittings or devices arranged to receive and hold the frame members of the crate wherever such members meet or intersect, suitable securing means being provided to prevent the crate frame members from withdrawing from the corner hold devices.

Each of the joining devices or fittings for the improved crate is a unitary fixture or body so shaped and designed as to receive the ends of meeting or intersecting crate members and retain such ends in proper relation to provide a solid and sturdy structure that will adequately withstand the abuses to which crates are subjected during the usual shipping and handling operations.

The frame of the improved crate is preferably constructed in accordance with present day standard crating practice wherein the boards or crate members meet in face-to-edge, overlapping relation whereby the greatest structural strength can be obtained from the material comprising the frame members. Such an arrangement of the crate frame members is illustrated in Figs. 1, 2 and 10 of the drawings wherein it will be seen that each frame member meets another frame member so that the two will engage in face-to-edge relationship. This is shown in detail in Fig. 2 wherein the top horizontal members I and 2 and the vertical corner member 3 all meet in such a way that the face of the horizontal member I engages the top edge of horizontal member 2 and the face of horizontal member 2 engages the outer edge of vertical member 3, while the face of member 3 engages the outer edge of member I. Likewise, each intermediate member, such as the vertical brace member 4, will have its inner face in engagement with the outer edge of a principal, transverse member, such as the horizontal member I.

As shown in Fig. 1, the crate frame members are retained in this face-to-edge overlapping relation by means of the fittings 5 and 6, each of which is a unitary structure comprising a plurality of tubular sections meeting in angular relation, and each section lying in a different plane and being arranged to receive one of the crate frame members as it is positioned to form the crate structure.

Each of the corner members 5 is a three way device preferably formed from a single piece of sheet metal material suitably welded so as to provide three tubular sections 7, 8 and 9, meeting in right angular relation and each opening outwardly from the body of the device in a different plane, whereby to receive the three principal crate members 1, 2 and 3 as they meet at the crate corner. The tubular sections of the corner unit thus serve as separate sockets in which the ends of the crate members are inserted respectively, and in which they are held.

In the form shown, the tubular sections are of a rectangular, oblong shape, having a transverse depth equivalent to the thickness of the boards comprising the crate frame members and a width equivalent to the width plus the thickness of the crate member boards, in order that the ends of the boards may be positioned squarely relative to each other as shown in Fig. 2, with the face of each board abutting the edge of another board.

It is contemplated that the corner securing devices for the improved crate construction will be manufactured in standard sizes for predetermined sizes of the boards comprising the crate frame members and hence when the ends of the frame members are inserted in the tubular sections of the corner fitting, they will fit snugly so as to minimize lateral play or wracking. Also, since the corner fitting has both inside and outside walls defining the tubular sections or sockets, the crate members inserted endwise in the sockets or tubular sections will be held securely against all lateral displacement and any suitable tie means, such as staples, wire binding or metal strapping, may be employed to prevent longitudinal or lengthwise displacement of the boards from the sockets.

In the construction illustrated in Fig. 1, longitudinal displacement of the crate frame members from the corner securing devices is prevented by the use of staples 10, which are driven through suitable openings provided in the outer wall of each tubular section. Such staples can be easily removed by means of a screw driver or any similarly pointed instrument, and it will be understood that several pairs of staple holes may be provided in the outer wall of each tubular section to permit relocation of the staple when the crate members are reassembled for successive use.

The two way fitting 6, which is employed for securing the junctures of intermediate braces with the main or principal crate frame members, is shown in detail in Fig. 7, and in this case the corner device comprises two tubular sections 11 and 12, arranged in right-angular face-to-edge overlapping relation. These tubular sections are of a size to fit the crate frame members, and the section 12, which receives a principal frame member, is open at both ends so that the principal crate member can extend through the fitting.

The modification of the improved joining device or fitting shown in Fig. 8, is particularly adapted for use where auxiliary or intermediate transverse bracing members, extending between the edges of principal members, are necessary to the crate construction, and in this case the fitting comprises a tubular member 13 open at each end so as to fit over an intermediate portion of one of the main frame members, and a transversely disposed tubular member 14 arranged to receive the end of the brace member, the tubular sections 13 and 14 being in face-to-face right angular relation and lying in different planes, one above the other. In the use of this device, the brace member will be preferably disposed on the inside of the crate whenever possible so as to prevent increasing the overall dimensions of the crate. Such an application of this fitting is illustrated in Fig. 10.

As shown in Fig. 8, this form of fitting may be provided with cut out portions 13.1 in the face surfaces of the section 13, and the transverse section 14 may be shorter than the width of the section 13. This permits the device to be used to connect two boards end to end, in order to build up one of the longer principal frame members from two short pieces, and to nail the end of the transverse member directly to the ends of the abutting pieces within the fitting.

The modified device or fitting illustrated in Fig. 9 is for use in crate construction where auxiliary encircling bracing may be required, and in this form the device comprises three tubular sections 15, 16 and 17 arranged in overlapping right angular relation and all lying in different planes. The sections 15 and 17, however, are in face-to-face abutment while the sections 15—16 and 16—17 are in face-to-edge abutment respectively. In the use of this fitting, the main crate frame member will extend through the section 15 while the transverse auxiliary brace members will have their ends seated in the sockets formed by the tubular members 16 and 17.

Fig. 11 illustrates another way of constructing the improved three way corner device for the crate, and in this arrangement, the corner device is built up of three individual tubular sections 18, 19 and 20, positioned in right angular, face-to-edge, overlapping relation and suitably welded together to form a unitary structure. The use of this device is exactly the same as the corner device 5, illustrated in Fig. 1 and Figs. 3 to 6 inclusive.

It will be understood that the improved crate construction and the corner or joint securing devices may be utilized for both open and closed crates. In the crate shown in Fig. 1, the corner devices are secured or tied to the crate frame members by means of staples, and the crate is closed by means of panels 21 and 22 for the sides and ends of the crate, and panels 23 for the top and bottom of the crate, which panels are placed on the inside of the crate frame and rest against the crate frame members. In this construction the panels are held in place by the crated goods and the internal bracing therefor.

Fig. 10 illustrates a closed crate construction in which the crate frame is held in assembled position by means of sheet-iron straps which encircle the crate in all three directions, the straps being positioned as close to the side edges of the respective crate faces as is practicable. With this arrangement for tying or binding the crate frame members together, a closed crate can be formed by placing the side panels on the outside of the crate frame members, where they will be held in place by the binding elements, the panels filling the side space between the outermost side frame members and resting against the edges of the inner side frame members.

While iron strapping or band-iron is shown in Fig. 10, it will be understood that wire binding may be employed in the place of the band-iron if desired, and in either case, the strapping or binding is applied and secured in the usual manner after the crate has been assembled.

The main advantages of this invention reside in the provision of a crate, assembled according to standard practice for maximum strength, in which all parts of the crate are completely salvagable and therefore may be of standard sizes adaptable to continuous re-use as crating material. Other advantages are to be found in that with the improved corner securing devices, the crate is readily adjustable for size so as to accommodate different sizes of goods, the adjustment being accomplished by substitution of crate members or by cutting down the length of the crate members when shortening is desired. Other advantages are to be found in the simplification of both crating and uncrating operations, whereby a material saving of labor cost is obtained; and in the salvage feature which permits the use of a better quality of pine wood that is not only stronger, but also lighter in weight. Thus, since there is no spoilage of the crating elements during the uncrating operation, the crating elements can be re-used by the receiver of the shipment or, after dissassembly of the crate, the elements, in knocked down form, can be easily and cheaply returned to the original shipper.

Although several embodiments of this invention are herein shown and described, it is to be understood that details of constructions shown may be altered or omitted without departing from the spirit of this invention as defined in the following claims.

I claim:

1. A device of the class described comprising three rectangular tubular sections disposed with their longitudinal axes in mutually overlapping right angular relation, the contiguous walls of said sections forming the sides of a trihedron and said sections being embodied in a unitary structure with each section opening outwardly therefrom.

2. A device of the class described comprising three rectangular tubular sections meeting in right angular relation with the contiguous walls of said sections forming the sides of a trihedron, said sections being embodied in a unitary structure, and each of said sections opening outwardly from the unitary structure in the direction of the respective section axis.

3. A corner device comprising a hollow body having outside walls and inside walls defining three passages of uniform section meeting in overlapping right angular relation with each other, the longitudinal axis of each of said passages lying in a different plane than the longitudinal axis of any one of the others, and each of said passages opening outwardly from said hollow body in a different direction.

4. A corner device comprising three tubular members having their ends meeting in transversely overlapping right angular relation with each other, the central axis of each member lying in a different plane than the central axis of any one of the other members, each of said members having an end opening outwardly from the juncture of said members, and said members being secured together to form a unitary body.

5. A corner device comprising three tubular members meeting in transversely overlapping right angular relation and each lying a different plane than the others, each of said members being of rectangular oblong section disposed in face-to-edge relation with the other members and having an end opening outwardly from the juncture of said members, the contiguous walls of said members forming the sides of a trihedron and said members being secured together to form a unitary body.

6. In a crate having vertical and horizontal frame members of rectangular section each lying in a different plane than the others and meeting transversely in face-to-edge overlapping relation to form a crate corner, a corner securing means comprising a hollow metal body having outside and inside walls defining three passages meeting in angular relation and adapted to receive said frame members respectively, each of said passages being disposed in the plane of the respective frame member and opening outwardly from the said body in the direction of the said frame member, the inside walls of said body forming the sides of a trihedron, and means to tie said corner means to said frame members.

7. In a crate having vertical and horizontal frame members of rectangular section all lying in different planes and meeting transversely in face-to-edge overlapping relation to form rectangular crate corners, a corner securing means for each of said corners comprising a unitary metal body having three tubular portions meeting in right angular relation and each formed to receive the end of a respective one of said frame members, each of said tubular portions being disposed in the plane of its respective frame member and opening outwardly in the direction of that frame member along the side of a trihedron common to all said tubular portions, and tie means encircling the crate in both vertical and horizontal directions.

8. A device of the class described comprising three tubular sections meeting in angular relation and disposed with their longitudinal axes mutually overlapping, the longitudinal axis of each section lying in a different plane than the longitudinal axis of any other section, said sections being embodied in a unitary structure and each section opening outwardly therefrom in the direction of its respective longitudinal axis.

WILLIAM E. DAVIS.

REFERENCES CITED

The following references are of record in the file of this patent:

UNITED STATES PATENTS

| Number | Name | Date |
|---|---|---|
| 296,444 | Perkins | Apr. 8, 1884 |
| 405,672 | Kruse | June 18, 1889 |
| 483,871 | Rex | Oct. 4, 1892 |
| 949,394 | Daly | Feb. 15, 1910 |
| 1,031,691 | Courville | July 9, 1912 |
| 1,215,839 | Nero | Feb. 13, 1917 |
| 1,445,630 | Leslie | Feb. 20, 1923 |
| 1,510,503 | Schmidt | Oct. 7, 1924 |

FOREIGN PATENTS

| Number | Country | Date |
|---|---|---|
| 36,041 | Germany | Jan. 25, 1909 |
| 372,840 | France | Mar. 1, 1907 |